United States Patent [19]

von Voros

[11] 4,008,523
[45] Feb. 22, 1977

[54] DIGITAL ELECTRO-OPTICAL MICROMETER AND GAGES

[75] Inventor: Geza von Voros, Glen Rock, N.J.

[73] Assignee: Optograms, Inc., Oakland, N.J.

[22] Filed: Aug. 9, 1974

[21] Appl. No.: 496,272

Related U.S. Application Data

[63] Continuation-in-part of Ser. No. 229,944, Feb. 28, 1972, abandoned.

[52] U.S. Cl. .......................... 33/143 L; 33/125 C; 33/147 F; 33/147 N
[51] Int. Cl.² ......................................... G01B 11/04
[58] Field of Search ............. 33/143 L, 147 F, 1 L, 33/125 C, 172 R, 172 E, 147 N

[56] References Cited

UNITED STATES PATENTS

| | | | |
|---|---|---|---|
| 674,487 | 5/1901 | Vassar | 33/147 F |
| 3,142,121 | 7/1964 | Stefanov | 33/143 L |
| 3,867,037 | 2/1975 | Litke | 33/125 C |

FOREIGN PATENTS OR APPLICATIONS

| | | | |
|---|---|---|---|
| 801,412 | 1951 | Germany | 33/172 R |

*Primary Examiner*—Richard E. Aegerter
*Assistant Examiner*—Willis Little
*Attorney, Agent, or Firm*—Ralph R. Roberts

[57] ABSTRACT

This invention pertains to an electro-optical digital precision micrometer and gages wherein a precision scale is carried in a frame and is moved with the movable anvil portion of the apparatus. The precision glass scale has a determined number of lines engraved thereupon and as the movable anvil is moved the lines are caused to be passed in front of a grating. A light source feeds a beam of light through the scale to a reading device whereby electrical pulses are converted into signals which are fed to a digital readout. A dash pot system is provided to restrict the speed of movements of the movable and the supported glass scale so that the lines of the scale as they cut the beam of light passing through the scales are positively detected by the photosensor. In addition to using this system in a micrometer, one or more of these systems may be used in a height gage and in a linear digital gage. In all embodiments the linear motion of the movable anvil or member is converted into electrical pulse signals in such a way that both the displacement and the direction of motion can be displayed.

4 Claims, 14 Drawing Figures

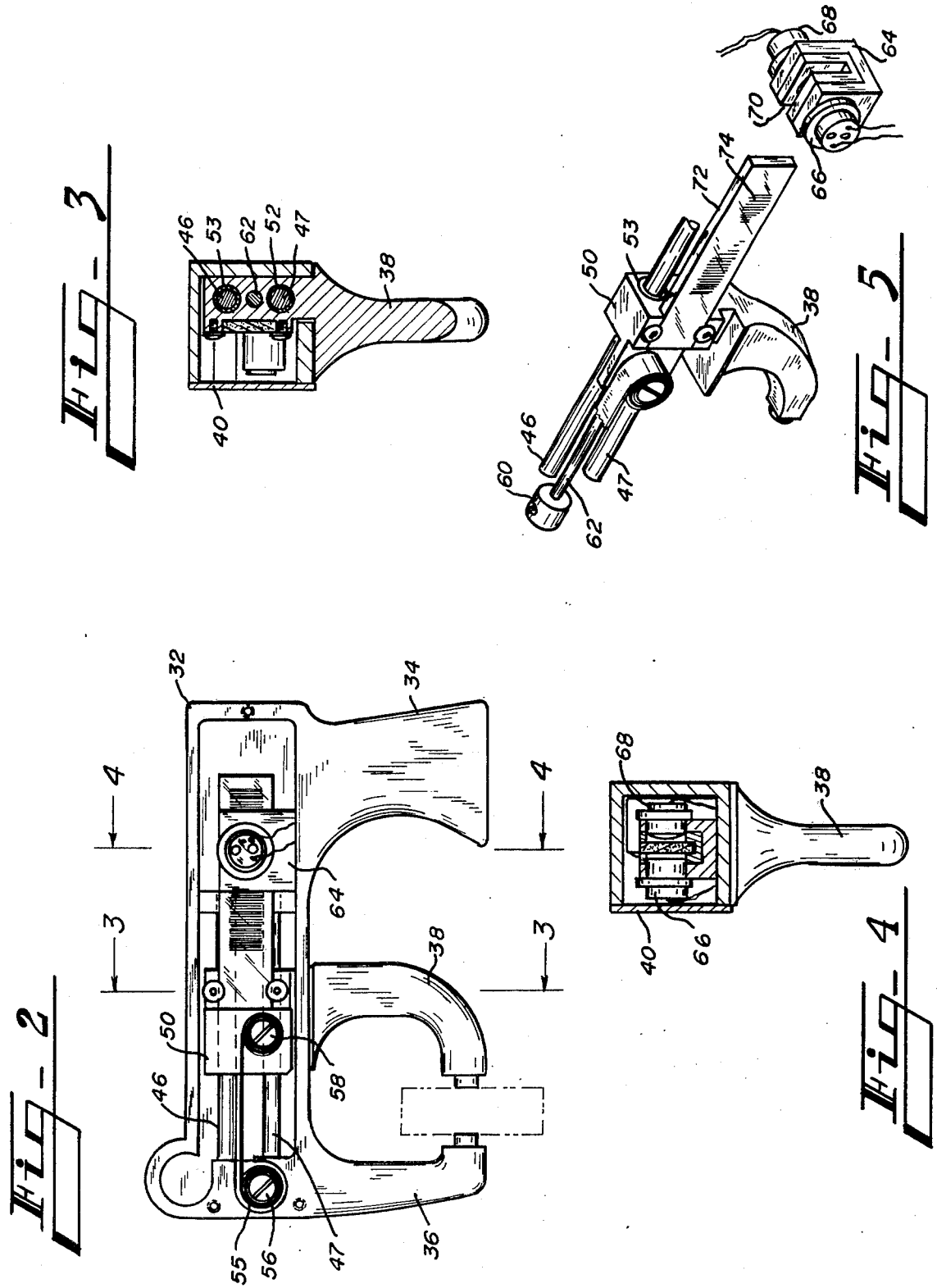

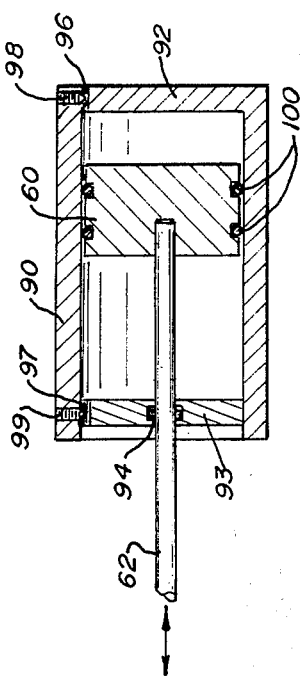
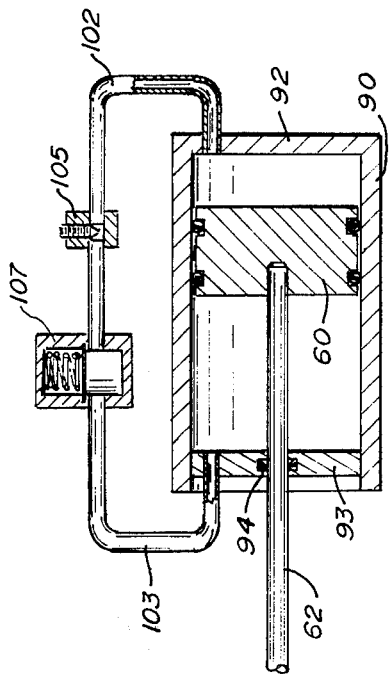
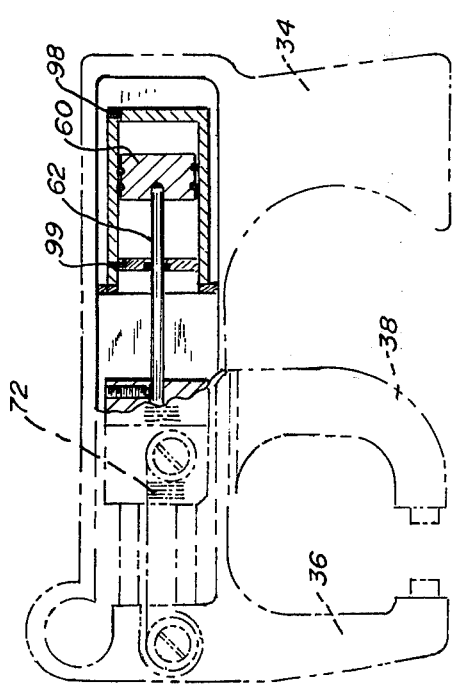
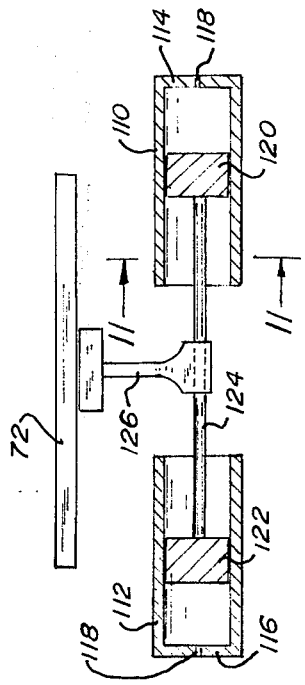

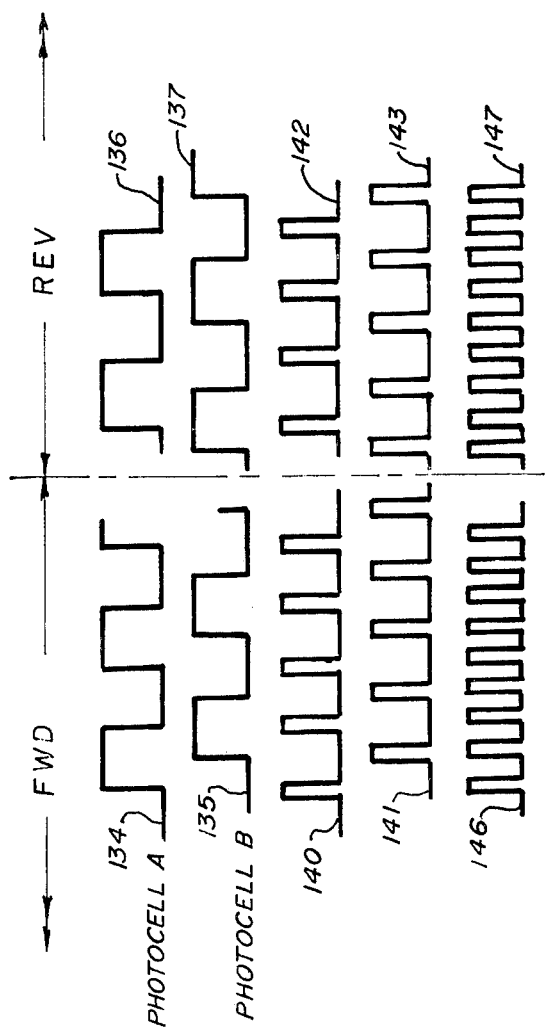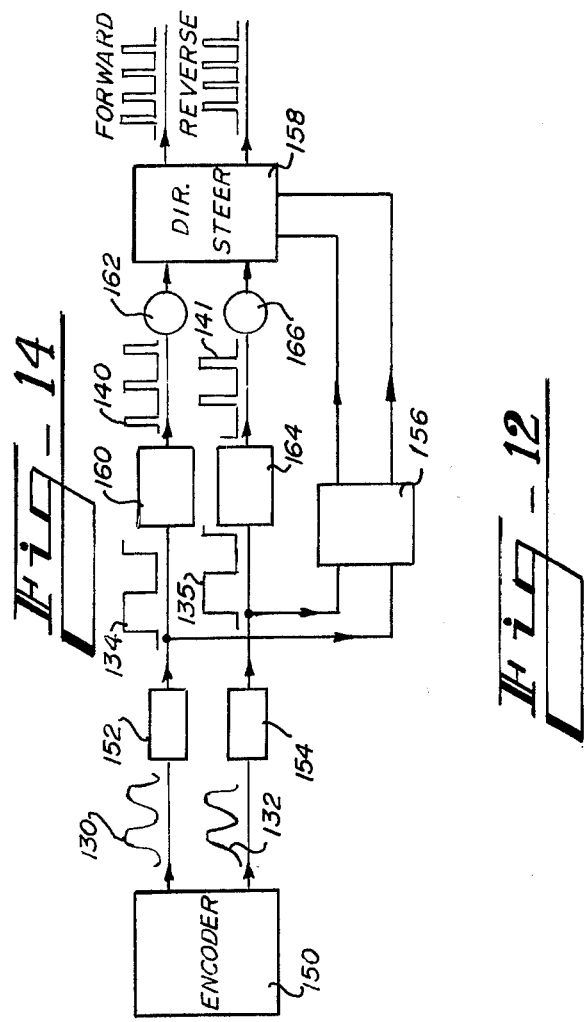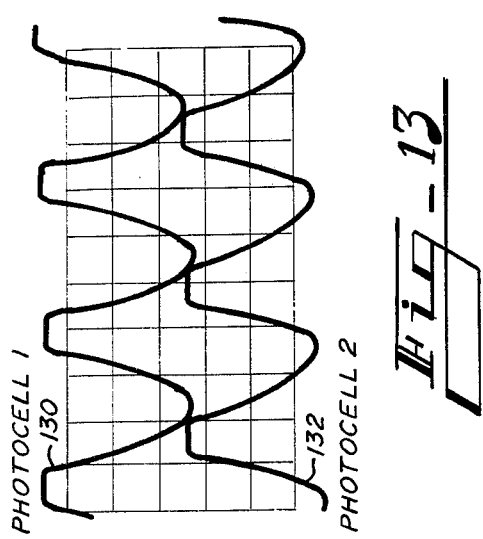

DIGITAL ELECTRO-OPTICAL MICROMETER AND GAGES

This is a Continuation-in Part Application of my Application Ser. No. 229,944 filed Feb. 28th, 1972 now abandoned.

BACKGROUND OF THE INVENTION

1. Field of the Invention

With reference to the classification of art as established in the United States Patent Office the field of art to which this invention pertains is found in the general Class of "Geometrical Instruments" (Class 33) and more particularly in the subclass of "distance measuring" (subclass 125R). Also of note is the art in the further subclass of "opposed contacts" (subclass 143R).

Further reference may be made to the general subclass of "digital computers" as found in the general Class of "Registers". (Class 235). In the Class of "Radiant Energy (Class 250) art of note may be found in the subclass of "for an optical system wherein a light valve is actuated by physical quantity or is actuated by a light chopper or by a rotary device" (subclass 232).

2. Description of the Prior Art

Micrometers which utilize a precision ground lead screw running in a precision nut are well known. In these devices the rotary motion of the barrel is read upon a scale inscribed upon the rotary anvil or a shell carried thereby. These micrometers, of course, are well known and for many years have been a standard in machine shops for use in measuring workpieces. Micrometers, having heads with optical rotary encoders attached to the lead screw, and with displayed readout, have been brought to the market in the past few years. Vernier calipers and height gages using precision-engraved scales are also well known and are particularly useful in making measurements of relatively long distances such as for measuring from zero to twelve inches or from zero to other units of a longer length. In the use of micrometers having a precision lead screw there have been many atttmepts and patents directed toward controlling the advancement of the lead screw to provide a determined amount of drive friction so that neither an excessive squeeze nor too light an engagement or grip on the object to be measured is provided in the use of the micrometer. It is well known, for example, that different inspectors well skilled in the use of a lead-screw type of micrometer and using the same micrometer under the same conditions may vary as much as two or three ten-thousandths of an inch in reading the measurements for the same workpiece. This variation, of course, occurs because of the hand manipulation provided by the inspector himself.

In the same manner the use of a vernier caliper and its precision scale depends upon the accuracy of the scale as well as the skill of the inspector in setting the jaws of the venier caliper. In addition to the requirement of physical dexterity in using these two well known types of measuring instruments there is also the potential visual tricks played upon the inspector in reading the setting of the barrel or reading of the vernier scale wherein numbers are transposed. Sometimes it becomes a matter of aligning or reading the degree of coincidence of a pair of lines as to which line is the nearest to the precise reading of the scales. Precision end measuring rods, gage-blocks (also known as Jo-blocks) and like precision measuring members are, of course, well known. The difficulty in using such type of devices is the necessity of accumulating the precise desired quantity of these precision-made measuring members. Dial indicators as measuring tools are also well known; however, their accuracy is again subject to many problems of wear and the maintenance of the gears and movable rack as well as the reading of the dials and the initial setting of the indicator.

In the present invention it is contemplated that a micrometer having a fixed anvil carried by a frame will have a movable anvil which is moved to a closed condition by means of a constant tension spring. The operator or user of the micrometer pulls or draws the movable anvil from the fixed anvil so that the piece to be measured is brought between the anvils, after which the movable anvil is released so that it is moved to and against the piece being measured under the influence of the predetermined constant tension spring. After the movable anvil has been brought to rest against the workpiece to be measured, an electrical readout visually displays the precise measurement between the fixed anvil and the movable anvil. In gages such as height gages and linear digital gages, modifications of the frame are made and the same measuring means are provided.

It is, of course, well known to use glass or metal scales to measure the travel of the worktables of machine tools. These scales and other measuring systems are usually fixed in relation to a frame and the scale itself is directly read in relation to the position of the indicating device as it is moved along the bed or table of the machine or work member which is used to measure the amount of travel of the machine tool or workpiece. Such readings do not correct the travel into digital readouts except some of the latest electro-optical linear encoders.

Rack and pinion systems used for driving rotary encoders are known as well as tape systems using a tape drawn around a precision pulley. It is also known to utilize a rotary movement of a precise roller over the face of a machine tool worktable. However, insofar as is known, these systems tend to develop both random and accumulative errors arising from dirt, linear expansion contraction because of changes in temperature or because of wear or slippage, causing these measuring systems to lose their precision even if the accuracy is initially provided.

In particular, as far as is known, there has been no tape system for a hand held micrometer vernier or height gage using a tape stored in a spring-loaded spool with the tape fed from the spool. Where the rotation of a precision roller is caused by said roller being driven by movement of the roller along the workpiece, this type of system in a micrometer or caliper would required that the workpiece being measured would be free of oil, dirt or a combination thereof. This, of course, cannot be guaranteed although essential in a very precision instrument.

In the present invention the electro-optical digital positioning micrometer, or a height or linear digital gage may utilize a glass scale whose length is closely related to the travel of the movable anvil of the micrometer. Each micrometer indicator is disposed to read the linear travel of the movable anvil. The scale and the rest of the movable portions of the micrometer is maintained in a substantially sealed enclosure condition so that the accuracy intially built into the micrometer will be maintained throughout its use and operation. This precision scale is utilized to cause pulses to be generated and fed to the readout.

SUMMARY OF THE INVENTION

This invention may be summarized at least in part with reference to its objects. It is an object of this invention to provide, and it does provide, an electro-optical digital precision micrometer vernier height or linear digital gage wherein within a frame, a glass scale is mounted and is moved by the linear travel of the movable anvil. The scale, as it is moved with and by the movable anvil, has precise lines. The lines cut a light beam passing therethrough to cause a photosensor to feed these interruptions as electrical pulses to a digital readout.

It is still a further object of this invention to provide, and it does provide, an electro-optical digital precision micrometer or linear digital gage wherein a precision scale is carried on or by the movable member with the scale being moved as said member is moved. This scale is moved in way of a light source and photosensor so that the resulting interruptions may cause electrical signals to be fed to a digital counter or readout.

The electro-optical digital precision micrometer, in accordance with the above object and the following description, is shown in a preferred embodiment. This embodiment is disposed to provide a precise readout of one coordinate of movement which corresponds to the movement of the movable anvil of the micrometer. The micrometer may be mounted in a clamp, bracket or the like or as a hand-held tool may be carried around to machine tools or to an inspection bench wherein the workpiece to be measured may be accurately and precisely measured by the digital precision micrometer.

In the disclosed embodiment the movable anvil is carried on a bracket which also at the same time carries a transparent or reflective scale on which is precisely engraved or inscribed opaque or reflecting lines which are brought in way of a photoelectric sensor arrangement and in which at least two photosensors are disposed to receive phase shifted illumination through the scale and phasing disc from the light source, thus generating pulses by the movement of the scale into electric signals fed to a readout. A dash pot system restricts the speed of travel of the movable anvil.

In yet another embodiment a linear digital gate in the manner of a depth micrometer as a plunger pin which is attached to a transparent or reflective scale on which are precisely engraved or inscribed lines which are brought in way of a photoelectric sensor arrangement. This lineal digital gage is also contemplated as being attachable to a dial indicator to provide a digital readout of such a mechanism.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the digital electro-optical micrometer and modifications thereof including a height gage and linear digital gage as adopted for use with a digital counter and readout and showing a preferred means for constructing the micrometer with a fixed and movable anvil. This specific embodiment and alternate embodiments thereof have been chosen for the purpose of illustration and description as shown in the accompanying drawings wherein:

BRIEF DESCRIPTION OF THE DRAWINGS

FIG. 2 represents a somewhat schematic side view of a precision micrometer wherein a glass scale is carried by a bracket and is moved with this bracket and the attached movable anvil;

FIG. 3 represents a sectional view taken on the line 3—3 of FIG. 2 and looking in the direction of the arrows;

FIG. 4 represents a sectional view taken on the line 4—4 of FIG. 2 and looking in the direction of the arrows;

FIG. 5 represents a partly fragmentary isometric view of the movable anvil, scale and the light source and receiving photoelectric system of the micrometer of FIG. 2;

FIG. 7 represents a side view partly diagrammatic of the micrometer and showing in particular a pneumatic dash pot mounted in the handle portion;

FIG. 8 represents a sectional side view in enlarged scale of the dash pot of FIG. 7;

FIG. 9 represents a sectional side view in the scale of FIG. 8 of a closed circuit fluid actuated dash pot providing an alternate means of motion speed control;

FIG. 10 represents a diagrammatic sectional view showing yet another pneumatic dash pot control which additionally provides a guide means for the scale member;

FIG. 11 represents a sectional view of a pneumatic dash pot portion, this view taken on the line 11—11 of FIG. 10 and looking in the direction of the arrows;

FIG. 12 represents a circuit diagram showing the actuation of the pulse generating means so that the digital readout positively adds or subtracts in accordance with the movement of the scale by a pair of photo detectors;

FIG. 13 represents the simultaneous sinusoidal waves of the two photocells as a line is passed in front of them, and FIG. 14 represents the reading of the pulses formed into square waves and the reading of each raising and falling edge of the square wave.

In the following description and in the claims various details will be identified by specific names for convenience; these names, however, are intended to be generic in their application. Corresponding reference characters refer to like members throughout the several figures of the drawings.

Figures 1, 6:
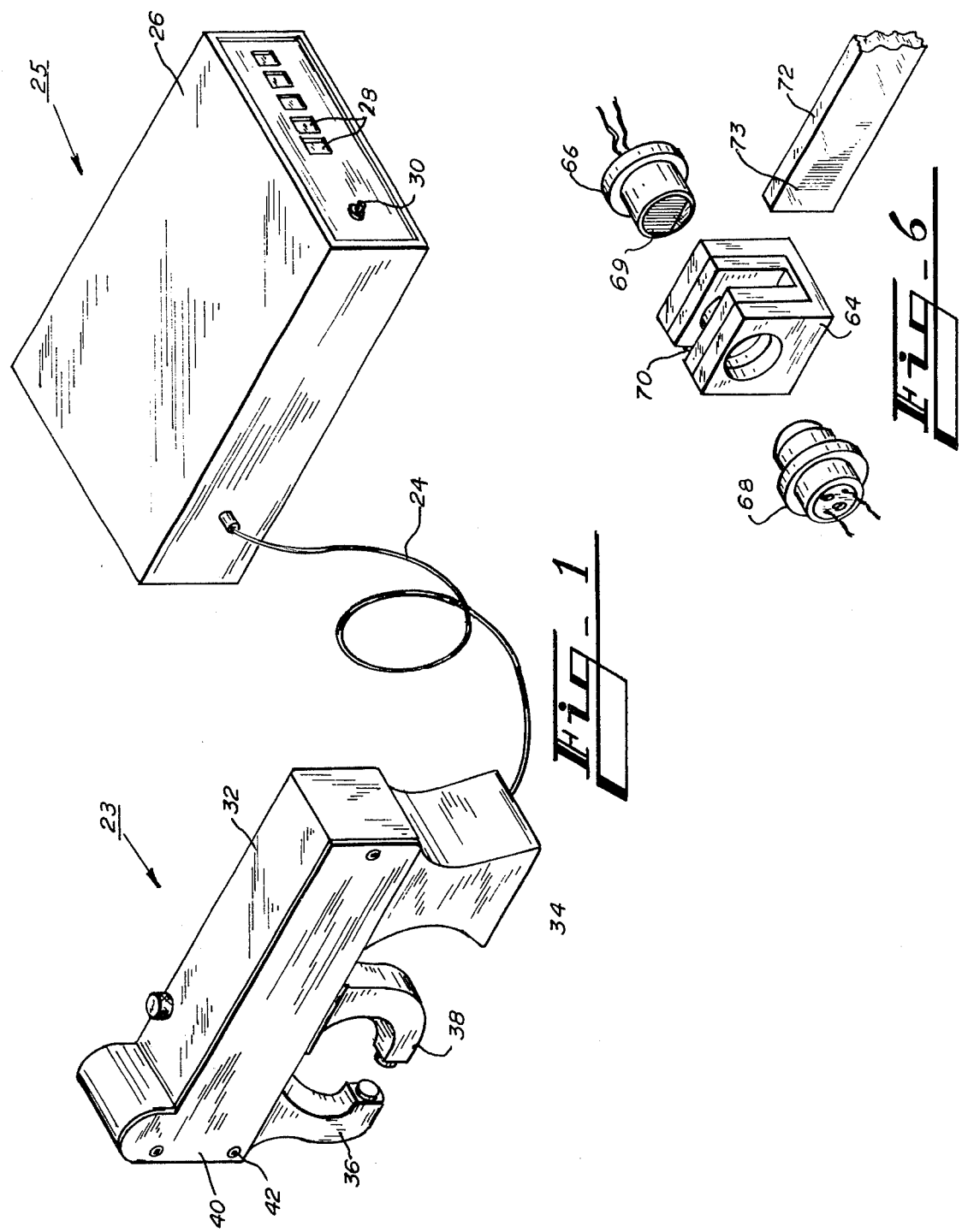
FIG. 1 represents a generally schematic isometric view showing an electro-optical micrometer of this invention as it is connected to a digital readout wherein the measurement of the movable anvil from its displacement from a fixed facing anvil is displayed on an electrical readout.
FIG. 6 represents a partially exploded and enlarged isometric view showing the arrangement of the electro-optical detecting system of FIG. 5 in which a glass scale is moved in way of a light beam whose interruptions are converted to pulsations.

The drawings accompanying, and forming part of, this specification disclose certain details of construction for the purpose of explanation of the broader aspects of the invention, but it should be understood that structural details may be modified in various respects without departure from the concept and principles of the invention.

DESCRIPTION OF THE PREFERRED EMBODIMENT

As seen in FIG. 1

Referring now in particular to the drawings there is depicted in FIG. 1 a precision electro-optical micrometer of this invention wherein the micrometer mechanical portion is geneally identified as 23. This portion is connected by means of a cable 24 to a digital readout 25. The electrical and electronic components are enclosed in a housing 26 which may or may not have an electrical power source therein. In the digital readout, of course, the front end of the case or cover is provided with numerical displays 28 which preferably are lightemitting diodes (led's) upon which the reading of the micrometer movement is displayed. A reset button 30 is also shown and is contemplated as being used in a conventional manner to erase a reading and reset the display to zero in a generally conventional manner.

Referring now in particular to the micrometer housing and to the mechanism as carried therein, it is to be noted that the housing itself, identified as 32, has a rear handle portion 34. As carried by the frame of this micrometer a forward anvil 36 is fixed to the frame and cooperates with a movable anvil 38 which is carried by the frame and is urged toward the fixed anvil by means of a constant force spring means carried within the housing 32. A side cover plate 40 is removably retained by screws 42 so that the internal portions of this micrometer may be adusted and serviced. This general arrangement is maintained throughout the several embodiments to be hereinafter more fully described. The movable anvil 38, as it is moved causes several mechanisms to be actuated, resulting in electrical pulses which are related precisely to the motion of anvil 38 and are fed to the digital readout 25 for converting the travel extent of the movable anvil 38 into a readout shown by the lightemitting diodes 28.

Embodiment of FIG. 2

Referring next to FIG. 2, there is shown a precision micrometer in which frame 32 has its cover 40 removed. The internal components, as seen, are also to be seen in FIGS. 3, 4, 5 and 6. In this frame the movable anvil 30 is carried upon a pair of guide rods 46 and 47 which is fastened in and is retained in the frame 32 in a determined parallel arrangement. A support bracket 50 is attached to or is made as an integral part of the anvil 38 and extends above the anvil and carries within it a pair of sleeve bearings 52 and 53 which is supported and fixed in the bracket portion 50 so as to provide a precision slide guide means upon the rods 46 and 47 and a determined travel path for the movable anvil 38. A constant force spring 55 is secured on one end by means of a stud 56 fastened to the frame 32 and on the other end by means of a stud or retaining post 58 fastened to the bracket portion 50 of the movable anvil 38. This constant spring is adapted to move the movable anvil 38 toward and to the fixed anvil 36 and during its extent of movement provides a determined urging of the movable anvil toward the fixed anvil. As seen particularly in FIGS. 3 and 5, there is also carried by bracket 50 a dash pot plunger 60 which is carried upon rod 62 and moves in a tube, not shown, carried by the frame 32 so as to prevent undue shock or undue rapid travel of the movable anvil 38 toward the fixed anvil 36. A support bracket 64 is fastened to and is carried by the frame 32 so as to carry at a fixed determination and spacing an electrical light source 68 which produces one or more beams of light toward and to a receiver 66 which may be a grouping of photocells or photosensors arranged in a determined array. An auxiliary grid or split disc or phasing disc 69 may be placed in way of the receiver's light paths to provide determined phases with phase shift. In its mounted condition the bracket 64 carries the photosensor and the light source 68 and the photosensors 66 so as to provide a determined guideway or spacing 70 in which is reciprocally passed a glass scale 72 having precision engraved, inscribed, or etched lines 73 upon its face. These lines are preferably very thin and of a precise width and spacing and may be arranged as one thousand, twelve hundred fifty, twenty-five hundred lines per inch. The scale 72 instead of glass may be made of metal or other opaque material in which case the lines 73 are "read" by reflective means wherein the light source and photosensor are mounted on the same side of the scale. This arrangement is particularly useful where it is desired to save thickness space.

Dash Pot System of FIGS. 7–9

Referring next to FIGS. 7, 8 and 9, there are depicted two dash pot systems one of which must be employed in the micrometer to insure that the scale 72 is moved at a speed which is sufficiently slow to insure that each of the lines 74 of the scale is detected by photosensors 66 (FIGS. 4 and 5). As seen in FIG. 8, a pneumatic open system has a plunger or piston 60 carried in a cylinder 90 which has a closed end 92. This end may be an integral part of the cylinder or, if desired, may be an inserted disc. The other end of the cylinder is closed by end disc 93 which carries rod 62. Seal 94 prevents or limits the flow of air along rod 62. Passageways 96 and 97 through ends 92 and 93 are selectively restricted as to the flow of air by means of adjusting screws 98 and 99. Seals 100 are conventionally carried by piston 60 to insure no unwanted leakage past the piston. The maximum rate of movement or speed of travel of the scale is adjusted to suit the ability of a pair of photosensors 66 to detect the cutting of the beam of light. The constant tension spring 55 pulls the movable anvil 38 toward fixed anvil 36. Counterflow or outward movement is achieved by the operator of the instrument by exerting a force against the constant tension spring.

System of FIG. 9

In FIG. 9 is depicted a closed hydraulic system similar to that of FIG. 8 but employing a liquid rather than air. The outer cylinder 90, instead of the open passageways found in ends 92 and 93, has fluid-tight connections to conductors 102 and 103. An adjustable flow restrictor means 105 is shown as placed in conductor 102. A pressure accumulator 107 may also be provided as a connection means for conductors 102 and 103.

In operation the movement of the movable anvil 38 causes a like movement of piston 60. The rate or speed of travel of the associated scale 72 is limited by restricting the rate of fluid transfer from the front to the rear of the cylinder 90. Accumulator 107 insures a constant pressure in the system.

System of FIGS. 10 and 11

Referring next to FIGS. 10 and 11 there is figuratively shown an alternate dash pot system in which air is used. In this system opposed open-ended dash pots are adapted to provide a guide path for the scale and movable anvil. This arrangement may eliminate or reduce to a certain extent the dependence on guide rods 46 and 47. Housings 110 and 112 are shown as substantially square or rectangular in cross-sectional configuration. The inner corners of these housings are rounded for manufacturing economies. The end closing portions 114 and 116 of these housings have small passageways 118 which are so sized as to restrict or limit the flow of air therethrough to the desired amount.

Pistons 120 and 122 are slidable in housings 110 and 112 and are fixed to a common rod 124. Fixed to the midportion of this rod 124 is a bracket 126 which carries scale 72. Bracket 126 is connected to and is positively moved with the corresponding movement of anvil 38. The dash pot arrangement, as shown in FIGS. 10 and 11 not only controls and limits the speed of travel of the movable anvil and scale 72 but also provides the means for establishing the travel path of the scale 72 and movable anvil 38.

Operation of Dash Pot Systems

Although modern electronic sensors would permit the scale 72 to be moved at a rate of travel in excess of one hundred inches per second, a rate of travel of one inch per second permits much smaller and less expensive components. The dash pot not only establishes this limit but also as in a shock absorber prevents or severely limits an unwanted bounce action of a released movable anvil as moved by the constant tension spring.

Sensing the Direction of Motion as in FIGS. 12 13 and 14

Referring next to FIGS. 12, 13 and 14, there is diagrammatically shown a preferred means for a positive sensing of the direction and of the counting the pulses achieved as the scale 72 is moved. Two or more photocells are optically aligned to produce two ninety degree phase-shifted sinusoidal waves each time an engraved line is passed in way of a light beam. As seen in FIG. 13, the line 130 depicts the wave pattern as read by photocell "A" as seen on an oscilloscope. The line 132 depicts the wave pattern as read by photocell "B" of the same engraved lines as they are passed by the photocell. Each wave pattern read by photocell "A" is repeated by photocell "B" except that the waves depicted by line 130 are 90° ahead or behind line 132. These two sine waves are next converted into square waves by a circuit known as Smitt Trigger (commercially available integrated circuit such as Texas Instrument's SN7413). The obtained ninety degree phase-shifted square waves are depicted as lines 134, 135, 136 and 137. If the scale is moving leftwardly for instance, or as in FIG. 7, the movable anvil is toward the fixed anvil and the squared output of the cell of line 134 is leading the squared output of the other cell represented by line 135. If the scale is moving rightwardly for instance, or as in FIG. 7, the movable anvil is away from the fixed anvil, the squared output of the cell "A" is represented by line 136 and is trailing the squared output of the second cell "B" depicted by line 137. A circuit known as "phase discriminator" senses which photocell output is the one which leads the other and actuates a steering circuit accordingly. The function of this circuit is described hereinafter in rspect to the circuit of FIG. 12.

A circuit known as "one-shot multi-vibrator" is used to differentiate the two square waves. This circuit is commerically available and such a unit as an integrated circuit is available from Texas Instrument's (SN74123). The result of the differentiation provides a separate pulse for each raising and falling edge of the two square waves. These pulses are represented as lines 140, 141, 142 and 143. These pulses are summed or added as indicated by lines 146 and 147.

The phase discriminator's message arrives at a direction steering circuit before the pulses do because of a delay circuit as shown in FIG. 12. By the circuit shown in FIG. 12, no pulses are missed and they go into the correct forward or reverse counting circuits.

Circuit of FIG. 12

An encoder 150 contains the light sources and the optically aligned photocells. The waves 130 and 132 are fed to the Smitt triggers 152 and 154 where they are converted to square wave formms 134 and 135. The signal output of Smitt triggers 152 and 154 are also fed to a phase discriminator 156 and from this discriminator to a direction steering circuit 158. The square wave signal 134 is fed to a differentiator 160 which reads each raise and fall of a pulse and as pulse signal 140 sends it to a delay 162 thence to the direct steering circuit 158. The square signal 135 from Smitt trigger 154 is fed to differentiator 164 which reads each raise and fall of a pulse and as signal 141 sends it to a delay 166 and thence to the direction steering circuit 158.

The principles shown in the block diagram of FIG. 12 are those used in pulse reading and counting systems where forward and reverse are detected and strictly accounted.

Modification of the Above Apparatus

In the above illustrated and described embodiments the apparatus has been shown with a selected and preferred grouping of components disposed to accommodate certain general conditions, however, other conditions may make modified constructions desirable or necessary. For example, in using one of the precision measuring equipment embodiments it may be desirable to feed the resulting measuring information to memory banks, computers, printouts and the like. In this way not only can the precision measuring equipment be used to make and display the desired visual measurement but also this information can be used for quality, quantitative and statistical control.

In another example the micrometer or the lineal gage may be constructed so as to rapidly and easily exchange the constant tension spring to provide an apparatus having more or less propulsive force on the movable member. Where the measuring apparatus is to measure workpieces that are of fragile, soft or resilient material it may be desirable that the movable anvil or pin have a large contact area and a spring-exerted force resulting in a few grams effective thrust. With such work use requirement the measuring apparatus will, of course, be modified to accommodate these particular requirements.

In the above shown and described embodiments, particularly those showing the hand-held micrometers, the anvils are depicted as disposed to accomplish and accommodate outside measurements of workpieces. As inside measurements are as important as outside measurements, anvils having ball contacts facing outwardly may conventionally be provided to engage inside diameters and other inside measurements to provide precise "inside" measurements of workpieces. Such anvils may be provided for all the above measuring apparatus.

In the claims the light receiving photosensor is defined in a singular sense in that one or more sensors may be deployed to receive and analyze each "cut" beam and as interrupted actuations count these pulses and there is provided a precise accounting of the movement of the anvil.

Terms such as "left", "right", "up", "down", "bottom", "top", "front", "back", "in", "out", "clockwise", "counterclockwise" and the like are applicable to the embodiments shown and described in conjunction with the drawings. These terms are merely for the purposes of description and do not necessarily apply to the position in which the several micrometer embodiments and height and linear pages may be constructed or used.

While particular embodiments and alternate embodiments have been shown and described it is to be understood the invention is not limited thereto since modifications such as the above suggested may be made within the scope of the accompanying claims and protection is sought to the broadest extent the prior art allows.

What is claimed is:

1. A digital electro-optical measuring micrometer in which the measurement is precisely determined and initiates electrical pulses fed to a digital readout, computer and the like, said micrometer including: (a) a U-shaped housing readily transportable to a point of measurement and within which all mechanically movable elements used to derive the precise measurement are self-contained, said housing further including a fixedly supported anvil; (b) a movable anvil carried by a precision guide means for movement toward and away from the fixedly supported anvil, said guide means disposed within the housing so that the movable anvil is precisely movable along a prescribed precision path and for a distance which is at least as great as the linear differential meaurement capacity of the micrometer; (c) a constant force spring attached at one end to the housing and at the other end to the movable anvil so as to urge the movable anvil from a maximum open to a closed condition and toward and to the supported anvil and all intermediate positions therealong with an equal and selected force at all positions from and including the open and closed positions so that at the time of measurement the force applied by the moveable anvil is equal, consistent and predetermined; (d) and encoder containing a light source and a pair of photosensors and including a passageway therethrough for a linear scale-like interrupter member, the encoder carried by the housing; (e) a linear interrupter member carried by and precisely moved in said passageway with the movement of the movable anvil against and with the bias of the constant force spring, said interrupter member having a sequence of a multiplicity of precisely equally spaced lines disposed thereon; (f) said light source and photosensors being positioned so that the lines of the interrupter member interrupt the beam of light as the interrupter member is moved, said interruptions as read by the photosensors being converted to electrical pulse signals; (g) a dash pot having a piston movable therein, said piston being movable by and with the movement of the movable anvil in association with said constant force spring for establishing means for regulating the maximum speed of travel of the interrupter member and the movable anvil to establish a sufficiently slow rate of movement of the interrupter member whereat and whereby each and every interruption of the beam of light is distinctly read by the photosensors to insure that each and every line of the interrupter member as it interrupts the beam of light converts said interruption to an electrical pulse signal; (h) said pair of photosensors being optically aligned so as to produce substantially simultaneously phase-shifted waves and pulses each time a line interruption occurs and to feed this information to a discriminator circuit which ascertains the direction of travel at that instant, and (i) a digital counter and readout adapted to receive said electrical signals and convert said pulse signals to information which is fed to converting apparatus such as a computer, memory, indicia display and the like with said information corresponding to the precise linear movement of the movable member.

2. A digital electro-optical measuring apparatus as in claim 1 in which the scale-like member is sufficiently transparent so that the light beam from said light source may pass through said member and the lines inscribed thereon are opaque so as to "cut" the beam of light when said lines are passed therethrough.

3. A digital electro-optical measuring apparatus as in claim 1 in which the scale-like member is opaque and the lines applied thereto are contrasting and are adapted to interrupt a reflected beam of light which is directed thereat.

4. A digital electro-optical measuring apparatus as in claim 1 in which the movable interrupter member is sufficiently transparent so that the light beam from said light source may pass through said member to a first photosensor and the lines inscribed on said interrupter member are opaque so as to "cut" the beam of light passing through said member and with the surface of said lines made sufficiently uniformly reflective so that the beam of light striking said reflective surfaces is directed to at least a second photosensor.

* * * * *

PO-1050
(5/69)

UNITED STATES PATENT OFFICE
CERTIFICATE OF CORRECTION

Patent No. 4,008,523      Dated February 22nd, 1977

Inventor(s) Geza von Voros

It is certified that error appears in the above-identified patent and that said Letters Patent are hereby corrected as shown below:

Column 1, line 42, "attmepts" should read -- attempts --.

Column 2, line 44, after "sion" insert -- or --.

Column 5, line 7, "geneally" should read -- generally --;

lines 14 and 15, "lighte-mitting" should read -- light-emitting --;

line 39, "lightemitting" should read -- light-emitting --.

Column 7, line 67, "rspect" should read -- respect --.

Column 8, line 20, "formms" should read -- forms --.

Column 9, line 17, "pages" should read -- gages --;

line 51, "and" second occurrence should read -- ar --.

Signed and Sealed this

Nineteenth Day of April 1977

[SEAL]

Attest:

RUTH C. MASON
*Attesting Officer*

C. MARSHALL DANN
*Commissioner of Patents and Trademarks*